(12) United States Patent
Yu et al.

(10) Patent No.: US 11,302,103 B2
(45) Date of Patent: Apr. 12, 2022

(54) METHOD AND APPARATUS FOR EXTRACTING VIDEO PREVIEW, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Xinwei Yu, Beijing (CN); Xi Zeng, Beijing (CN); Fu Li, Beijing (CN); Shilei Wen, Beijing (CN); Jiaqi Jiang, Beijing (CN); Xin Zhang, Beijing (CN); Feng Li, Beijing (CN); Baoyu Zhang, Beijing (CN); Meng Qi, Beijing (CN); Lixing Gong, Beijing (CN); Rongrong Han, Beijing (CN); Yueyang Song, Beijing (CN); Fantian Meng, Beijing (CN); Haiping Wang, Beijing (CN); Xiao Liu, Beijing (CN); Hao Sun, Beijing (CN); Xubin Li, Beijing (CN); Chenghao Chang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 587 days.

(21) Appl. No.: 16/181,046

(22) Filed: Nov. 5, 2018

(65) Prior Publication Data
US 2019/0163981 A1    May 30, 2019

(30) Foreign Application Priority Data
Nov. 28, 2017 (CN) .......................... 201711214955.7

(51) Int. Cl.
*G06V 20/40* (2022.01)
*G06K 9/62* (2022.01)
*G06V 10/44* (2022.01)

(52) U.S. Cl.
CPC .......... *G06V 20/47* (2022.01); *G06K 9/6274* (2013.01); *G06V 10/454* (2022.01); *G06V 20/41* (2022.01)

(58) Field of Classification Search
CPC ............. G06K 9/00751; G06K 9/6274; G06K 9/6268; H04N 21/472; H04N 21/488;
(Continued)

(56) References Cited

U.S. PATENT DOCUMENTS

2007/0136750 A1* 6/2007 Abanami ......... H04N 21/47205
725/44
2016/0034786 A1* 2/2016 Suri ..................... G06K 9/6256
382/159
(Continued)

FOREIGN PATENT DOCUMENTS

| CN | 106162378 A | 11/2016 |
|---|---|---|
| CN | 106210444 A | 12/2016 |

(Continued)

OTHER PUBLICATIONS

First Office Action and Search Report from CN app. No. 201711214955.7, dated Feb. 28, 2019, with English translation from Global Dossier.

(Continued)

*Primary Examiner* — Girumsew Wendmagegn
(74) *Attorney, Agent, or Firm* — Ladas & Parry, LLP

(57) ABSTRACT

The present disclosure provides a method and apparatus for extracting a video preview, a device and a computer storage medium. The method comprises: inputting a video into a video classification model obtained by pre-training; obtaining weights of respective video frames output by an attention module in the video classification model; extracting continuous N video frames whose total weight value satisfies a preset requirement, as the video preview of the target (Continued)

video, N being a preset positive integer. It is possible to, in the manner provided by the present disclosure, automatically extract continuous video frames from the video as the video preview, without requiring manual clipping, and with manpower costs being reduced.

20 Claims, 10 Drawing Sheets

(58) Field of Classification Search
CPC .. H04N 21/485; H04N 21/4882; G06V 20/47; G06V 10/454; G06V 20/41; G06V 10/82; G06V 20/46
See application file for complete search history.

(56) References Cited

U.S. PATENT DOCUMENTS

| | | | |
|---|---|---|---|
| 2018/0189950 A1* | 7/2018 | Norouzi | G06N 3/084 |
| 2018/0276841 A1* | 9/2018 | Krishnaswamy | G06K 9/00671 |

FOREIGN PATENT DOCUMENTS

| | | |
|---|---|---|
| CN | 106231437 A | 12/2016 |
| CN | 107295362 A | 10/2017 |
| CN | 107341462 A | 11/2017 |

OTHER PUBLICATIONS

Second Office Action and Search Report from CN app. No. 201711214955.7, dated May 7, 2019, with English translation from Global Dossier.

Third Search Report from CN app. No. 201711214955.7, dated Aug. 2, 2019, with English translation from Global Dossier.

First Office Action from CN app. No. 201711214152.1, dated Mar. 8, 2019, with English translation provided by Global Dossier.

Second Office Action from CN app. No. 201711214152.1, dated Jun. 6, 2019, with English translation provided by Global Dossier.

Notification to Grant Patent Right for Invention from CN app. No. 201711214152.1, dated Sep. 12, 2019, with English translation provided by Global Dossier.

* cited by examiner

METHOD AND APPARATUS FOR EXTRACTING VIDEO PREVIEW, DEVICE AND COMPUTER STORAGE MEDIUM

The present application claims the priority of Chinese Patent Application No. 201711214955.7, filed on Nov. 28, 2017, with the title of "Method and apparatus for extracting video preview, device and computer storage medium". The disclosure of the above application is incorporated herein by reference in its entirety.

FIELD OF THE DISCLOSURE

The present disclosure relates to the technical field of computer application, and particularly to a method and apparatus for extracting a video preview, a device and a computer storage medium.

BACKGROUND OF THE DISCLOSURE

Currently, Internet information transfer media already develop from words and images to a video era. Particularly, short video industry develops rapidly in recent years and causes a growth spurt of video resources. At present, a user's selection and browsing of video content mainly depends on video titles and cover pictures. However, static video titles and cover pictures are limited in expressing video content. The user might miss desired video resources due to insufficient illustration of titles and cover pictures, or find that satisfaction with the video content fails to meet expectation after viewing the video content, thereby wasting the user's time and network resources.

In the prior art, if the user hopes to obtain more visual information of the video, he may search in the network for the video preview of the video. However, since the video preview in the prior art is usually formed by manual clipping with higher costs. Usually only big-budget TV serial or movie-type videos have video previews, and other types of videos usually do not have video previews.

SUMMARY OF THE DISCLOSURE

In view of the above, the present disclosure provides a method and apparatus for extracting a video preview, a device and a computer storage medium, to facilitate implementation of automatic extraction of the video preview and reduction of manpower costs.

Specific technical solutions are as follows:

The present disclosure further provides a method for extracting a video preview, the method comprising:

inputting a video into a video classification model obtained by pre-training;

obtaining weights of respective video frames output by an attention module in the video classification model;

extracting continuous N video frames whose total weight value satisfies a preset requirement, as the video preview of the target video, N being a preset positive integer.

According to a specific implementation mode of the present disclosure, the video classification model comprises: a Convolutional Neural Network, a time sequence neural network, an attention module and a fully-connected layer.

According to a specific implementation mode of the present disclosure, the preset requirement comprises: a total weight value is the largest; or larger than or equal to a preset weight threshold.

According to a specific implementation mode of the present disclosure, a training process of the video classification model comprises:

taking a video whose video class is pre-annotated, as training data;

training the video classification model by taking the video in the training data as input of the video classification model and by taking the corresponding video class as output of the video classification model, to minimize a loss function of a classification result.

According to a specific implementation mode of the present disclosure, during the training process of the video classification model, taking the video in the training data as input of a convolutional neural network to output convolutional features of respective frames in the video;

taking the convolutional features of respective frames as input of a time sequence neural network, to output time sequence features of respective frames;

taking time sequence features of respective frames as input of the attention module to output weights of respective frames;

mapping to a video type at a fully-connected layer according to weights of respective frames and output of the time sequence neural network;

using a mapping result to calculate a loss function.

According to a specific implementation mode of the present disclosure, the time sequence neural network comprises:

a Short-Term Memory, a Recurrent Neural Network RNN or a Gated Recurrent Unit GRU.

According to a specific implementation mode of the present disclosure, the method further comprises:

if a target video is located on a page, displaying a video preview of the target video.

According to a specific implementation mode of the present disclosure, the locating the target video comprises:

locating a video at a target position in a video feed page; or locating a video at a target position in a video aggregation page.

According to a specific implementation mode of the present disclosure, the displaying a video preview of the target video comprises:

after locating the target video, automatically playing the video preview of the target video; or playing the video preview of the target video after detecting an event that the user triggers the play of the video preview.

According to a specific implementation mode of the present disclosure, during displaying a video preview of the target video, displaying prompt information that the video preview is being played.

According to a specific implementation mode of the present disclosure, the method further comprises:

playing the target video after detecting an event that the user triggers the play of the target video.

The present disclosure further provides an apparatus for extracting a video preview, the apparatus comprising:

an input unit configured to input the target video into a video classification model obtained by pre-training;

an obtaining unit configured to obtain weights of respective video frames output by an attention module in the video classification model;

an extracting unit configured to extract continuous N video frames whose total weight value satisfies a preset requirement, as the video preview of the target video, N being a preset positive integer.

According to a specific implementation mode of the present disclosure, the apparatus further comprises:

a training unit configured to train the video classification model and specifically execute:

take a video whose video class is pre-annotated, as training data;

train the video classification model by taking the video of the training data as input of the video classification model and by taking the corresponding video class as output of the video classification model, to minimize a loss function of a classification result.

According to a specific implementation mode of the present disclosure, the training unit is configured to, in the training process of the video classification model, take the video in the training data as input of a convolutional neural network to output convolutional features of respective frames in the video;

take the convolutional features of respective frames as input of a time sequence neural network, to output time sequence features of respective frames;

take time sequence features of respective frames as input of the attention module to output weights of respective frames;

map to a video type at a fully-connected layer according to weights of respective frames and output of the time sequence neural network;

use a mapping result to calculate a loss function.

According to a specific implementation mode of the present disclosure, the apparatus further comprises:

a locating unit configured to locate a target video on a page;

a first displaying unit configured to display a video preview of the target video.

According to a specific implementation mode of the present disclosure, the locating unit specifically performs:

locating a video at a target position in a video feed page; or locating a video at a target position in a video aggregation page.

According to a specific implementation mode of the present disclosure, the first displaying unit specifically performs upon displaying the video preview of the target video:

after locating the target video, automatically play the video preview of the target video; or play the video preview of the target video after detecting an event that the user triggers the play of the video preview.

According to a specific implementation mode of the present disclosure, the apparatus further comprises:

a second displaying unit configured to play the target video after detecting an event that the user triggers the play of the target video.

The present disclosure further provides a device, comprising:

one or more processors, a storage for storing one or more programs, the one or more programs, when executed by said one or more processors, enable said one or more processors to implement the above-mentioned method.

The present disclosure further provides a storage medium including computer-executable instructions which, when executed by a computer processor, execute the abovementioned method.

As can be seen from the above technical solutions, it is possible to, in the manner provided by the present disclosure, automatically extract continuous video frames from the video as the video preview, without requiring manual clipping, and with manpower costs being reduced.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Embodiment 1

Figure 1:
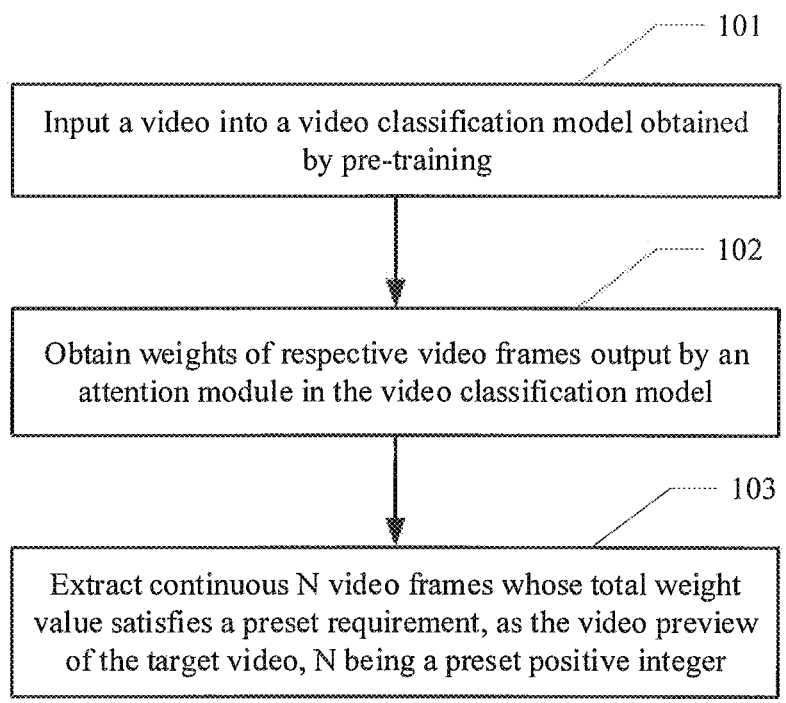
FIG. 1 is a flow chart of a method for extracting a video preview from a video according to Embodiment 1 of the present disclosure.

FIG. 1 is a flow chart of a method for extracting a video preview from a video according to an embodiment of the present disclosure. As shown in FIG. 1, the method may comprise the following steps:

At 101, input the video into a video classification model obtained by pre-training.

The video classification model involved in the present disclosure is a model implementing classification of videos, that is, a video is input into the video classification model, and then a class corresponding to the video may be output.

To facilitate understanding of the video preview extracting process, the structure and the training process of the video classification model are introduced first.

The video classification model involved in the present disclosure may comprise the following portions: a Convolutional Neural Network (CNN), a time sequence neural network, an attention module and a fully-connected layer.

When the video classification model is trained, it is possible to obtain training data first, namely, rake a lot of videos whose video classes are already annotated, as the training data. The annotated video classes may be obtained by annotating according semantic content of the video, for example, annotating the videos as video classes such as entertainment, sports, selfies, and fair ladies.

It is possible to train the video classification model by taking the video of the training data as input of the video classification model and by taking the corresponding video class as output of the video classification model, to minimize a loss function of a classification result.

Figure 2A:
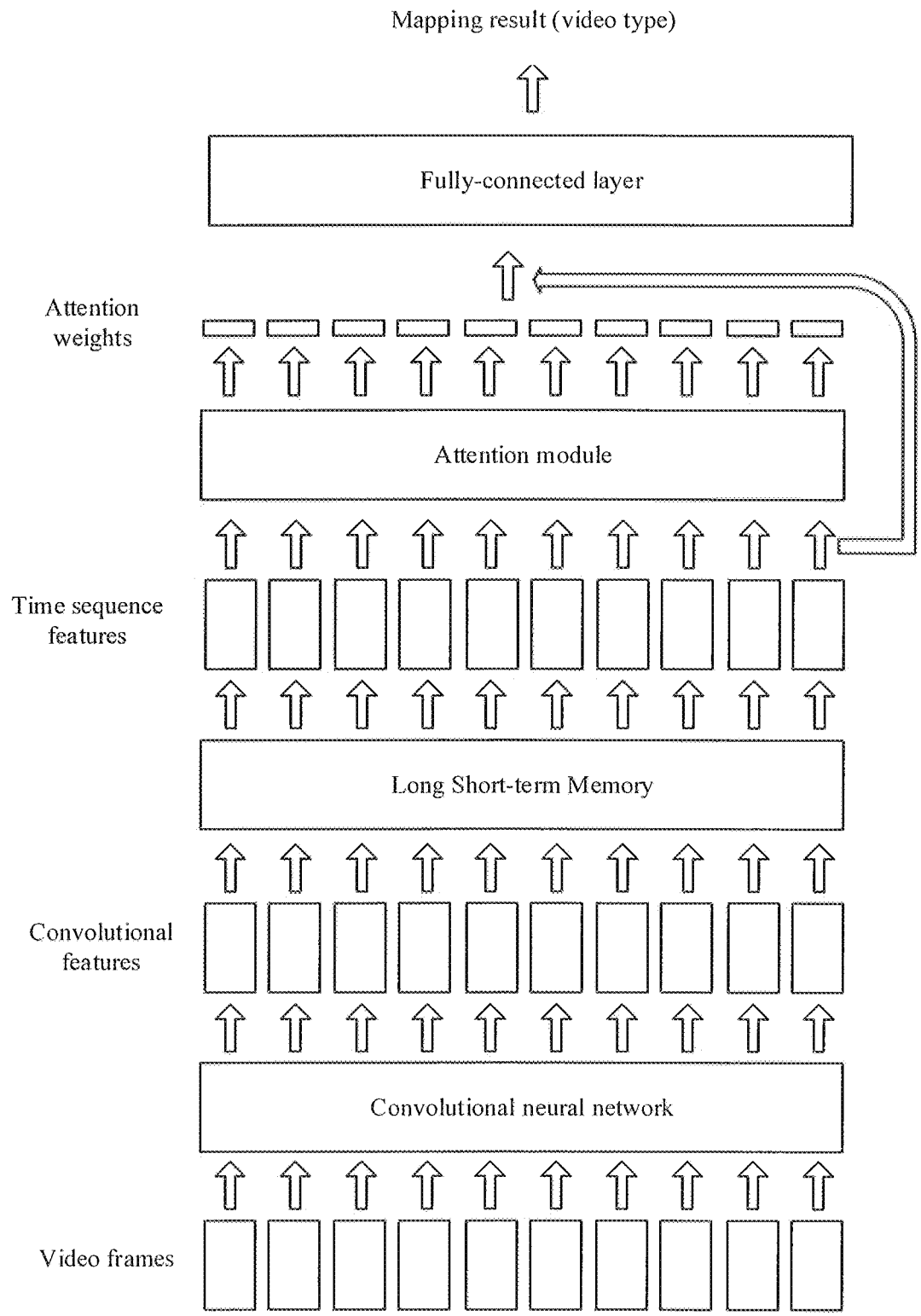
FIG. 2a is a structural schematic diagram of a video classification model according to Embodiment 1 of the present disclosure.

Specifically, as shown in FIG. 2a, the video in the training data first serves as input of the convolutional neural network, the convolutional neural network extracts convolutional features from video frames of the video respectively, and outputs the conventional features of respective video frames, namely, each video frame has a corresponding convolutional feature.

The convolutional features of respective video frames are input into the time sequence neural network. In FIG. 2a, a Long Short-Term Memory (LSTM) is taken as an example. The Long Short-Term Memory is a time sequence recurrent neural network structure, it extracts time sequence features from respective video frames from the convolutional features of the respective video frames, and outputs time sequence features of respective video frames. It is possible to employ, in addition to the Long Short-Term Memory, for example a Gated Recurrent Unit (GRU) or a Recurrent Neural Network (RNN).

The time sequence features of respective video frames are input in an attention module, and the attention module outputs attention weights of respective video frames. The attention module in fact generates depictions of respective video frames by using an attention mechanism.

The depictions of respective video frames includes, in addition to the weights output by the attention module, time sequence features of the respective video frames output by the Long Short-Term Memory. The depictions of the respective video frames are taken as input of the fully-connected layer. Specifically, it is possible to use the weights of the respective video frames output by the attention module to perform weighting processing for the time sequence features of respective video frames, and take obtained vectors as input of the fully-connected layer. The fully-connected layer performs mapping from video vectors to video types according to input video vectors.

It is feasible to use a mapping result of the fully-connected layer to calculate a loss function, for example, use a gradient descent algorithm to calculate a cross entropy loss function of the classification result, then feed back the cross entropy loss function to adjust parameters in layers in the model, and continue to train with a purpose of minimizing the loss function.

At 102, obtain weights of respective video frames output by the attention module in the video classification model.

After the video whose video preview is to be extracted is input into the duly-trained video classification model, the video classification model begins to classify the video. That is, after extracting the convolutional features from respective frames of the video, the convolutional neural network outputs the convolutional features to the LSTM; after using the convolutional features of respective frames to extract time sequence features of respective frames, the LSTM outputs the time sequence features to the attention module; the attention module determines attention weights of respective frames according to time sequence features of respective frames; vectors of the video are obtained after performing weighting processing for time sequence features and the attention weights of respective frames; the fully-connected layer uses the vectors to perform mapping to obtain the class of the video.

However, in the present step, it is possible to obtain weights of respective video frames by only obtaining the output of the attention module in the video classification model.

At 103, extract continuous N video frames whose total weight value satisfies a preset requirement, as the video preview of the video, N being a preset positive integer.

Figure 2B:
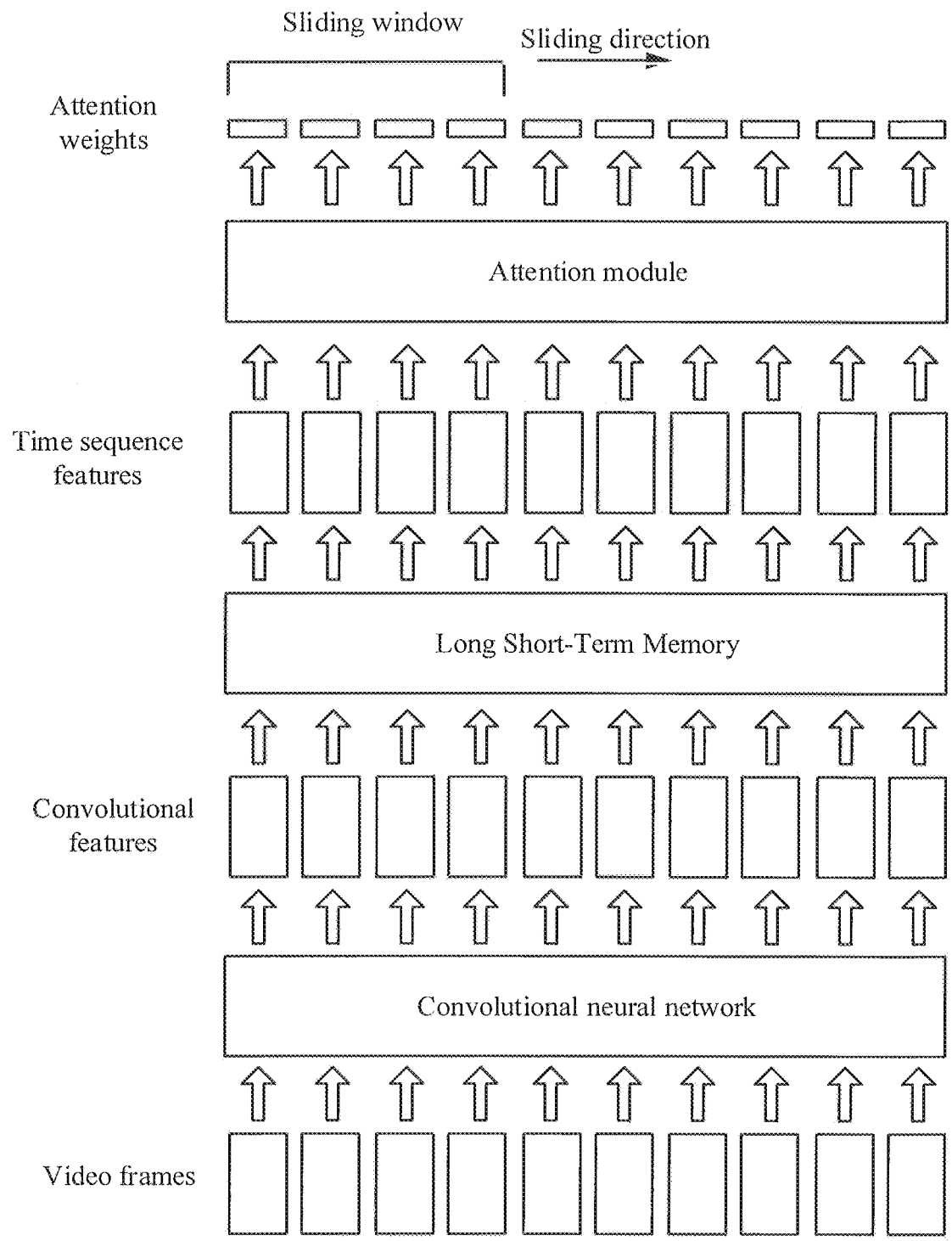
FIG. 2b is a schematic diagram of a sliding window according to Embodiment 1 of the present disclosure.

When the video preview is extracted, it is only necessary to obtain the output of the attention module in the video classification model. It is possible to use a sliding window as shown in FIG. 2b. During the sliding of the sliding window, a total weight of all frames in the window is calculated respectively, and the total weight may be a sum of weights of respective frames in the window. After completion of the sliding of the sliding window, it is possible to select video frames included by a sliding window position whose total weight satisfies a preset requirement, as the video preview. The preset requirement may be a maximum total weight value, or the total weight value exceeding a preset weight threshold.

A length of the sliding window may be a length of the video preview to be extracted. For example, a 6 s video preview is to be extracted, a 6 s sliding window may be set. Take a PAL type (25 frames per second) video as an example. The sliding window has a length of 150 frames, namely, N is 150 frames.

In addition, if multiple groups of video frames are extracted and each group of video frames include continuous N video frames, it is possible to concatenate the multiple groups of video frames and then form the video preview.

After the video previews of respective videos are extracted in the above manner, they may be stored. In the subsequent process, the previews of videos may be displayed on the webpage in real time. The method for displaying the video is described in detail through Embodiment 2.

Embodiment 2

Figure 3:
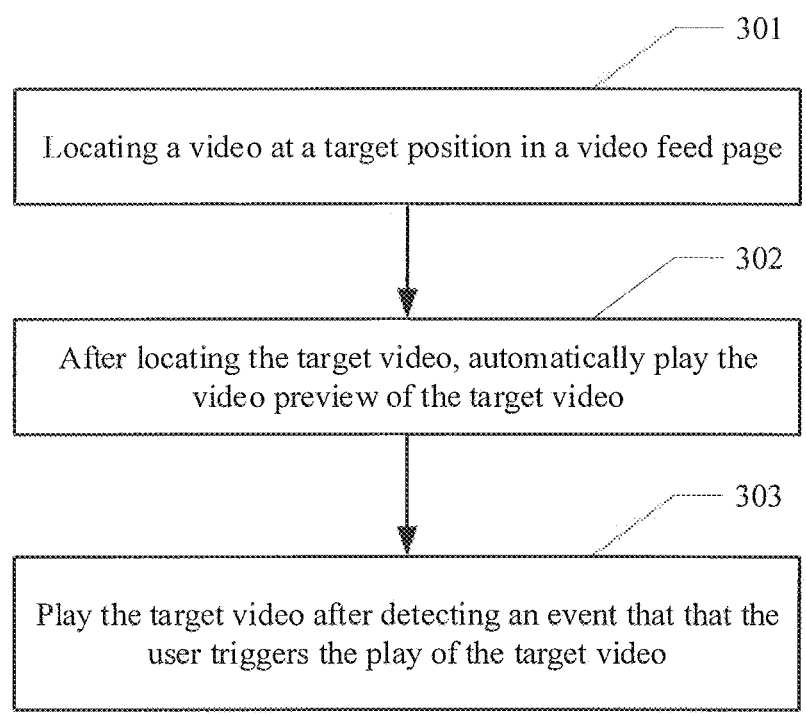
FIG. 3 is a flow chart of a method of displaying a video according to Embodiment 1 of the present disclosure.

The present embodiment is a flow chart of a method for displaying a video. As shown in FIG. 3, the flow chart may comprise the following steps:

At 301, locate a video located at a target position in a video feed page.

The present step provides a target video locating manner. The so-called video feed page refers to a source page of the video, and may be considered as a playing page of the video. The content of the video may be directly played on the page.

Figure 4A:
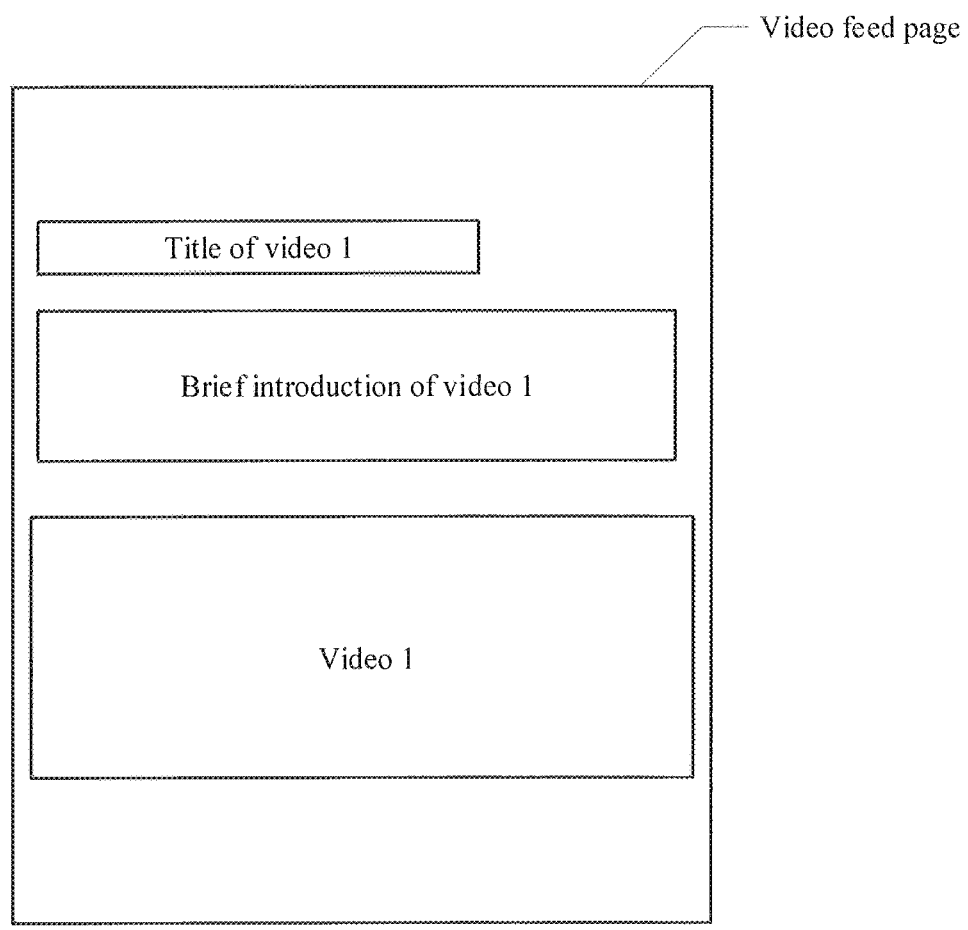
FIG. 4a and FIG. 4b are schematic diagram of two types of video feed pages according to Embodiment 1 of the present disclosure.

After the user enters the video feed page in a manner such as visiting a designated link or jumping after searching, if there only exists information of one video on the video feed page, the video is taken as the target video. As shown in FIG. 4a, there only exists information of video 1 on the video feed page, and the video 1 is taken as the target video.

Figure 4B:
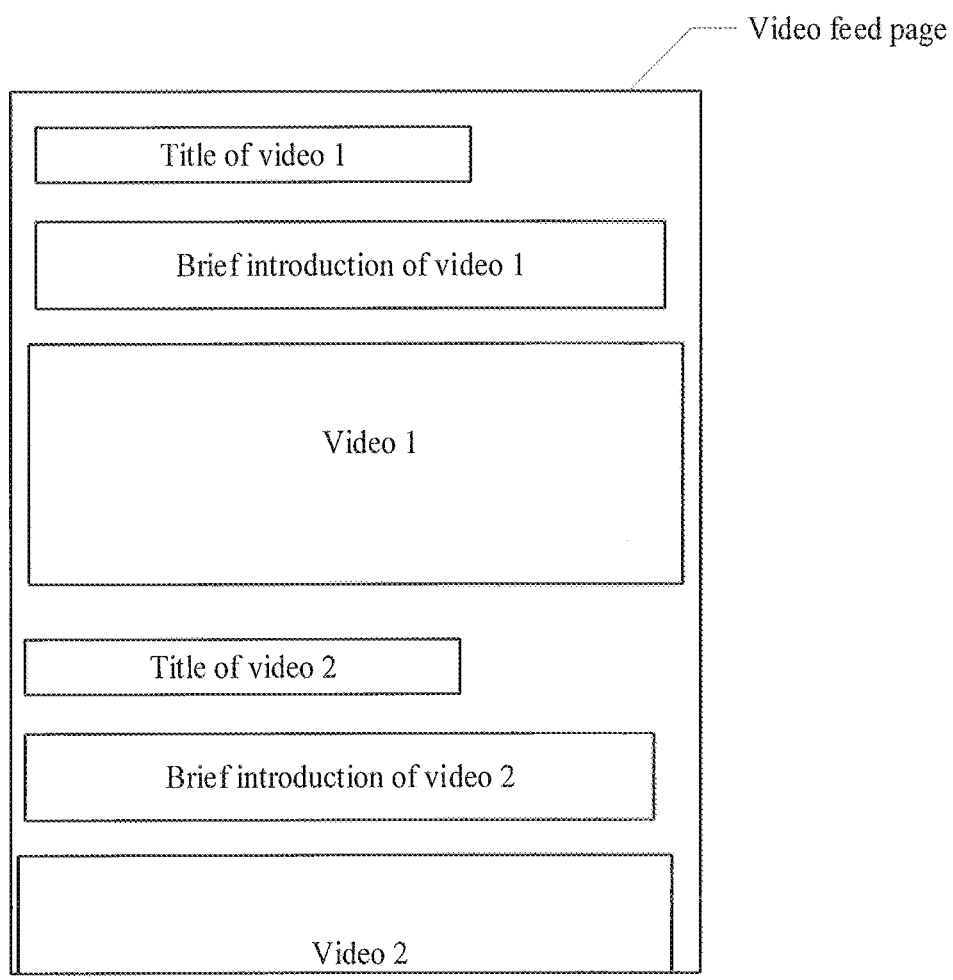

If there exist a plurality of videos on the video feed page, it is possible to take the video at the target position as the target video, for example, a video located at the topmost end or a video located at a designated area. It needs to be appreciated that as the user slides, different videos will be located at the target position in turn, and the video currently located at the target position is taken as the target video. As shown in FIG. 4b, there exists information of video 1 and video 2 on the video feed page, and video 1 located at the topmost end is taken as the target video.

In addition, other manners besides the manner of locating the target video stated in 301 may be employed. For example, the present disclosure is further adapted for a video aggregation page. The so-called video aggregation page refers to aggregating videos from different sources to the same page. Usually, the video cannot be directly played in the video aggregation page, and the video is played after the page jumps. It is possible to locate and take the video located at the target position in the video aggregation page as the target video, for example, take the video located at the topmost end as the target video, or take the video in a middle region as the target video.

At 302, after locating the target video, automatically play a video preview of the target video.

In this step, it is possible to automatically play the video preview of the target video right after locating the target video, or after locating the target video, automatically play the video preview of the target video if the target video keeps at the target position for a preset duration.

In the step, the video preview may replace the position of the video cover in the prior art. The user may acquire rough content or wonderful sections of the target video through the video preview, thereby determining whether to view the target video.

Figure 5A:
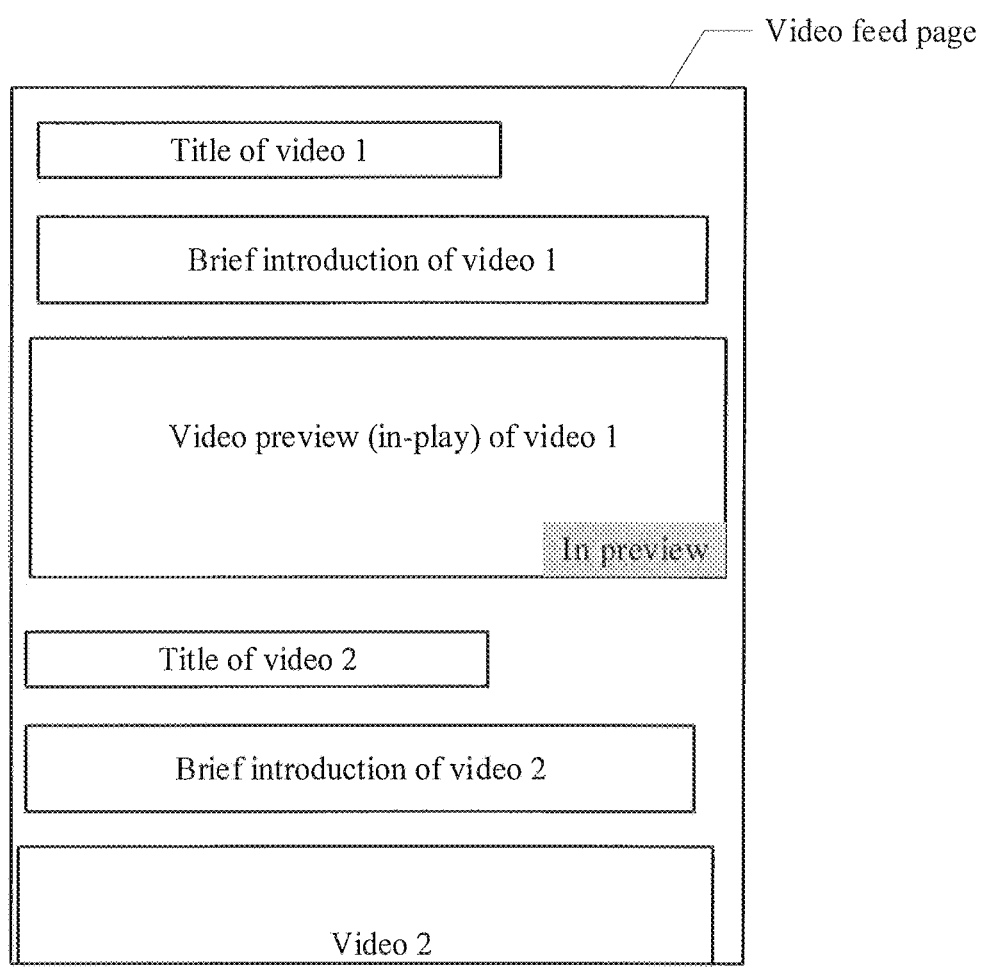
FIG. 5a and FIG. 5b are two kinds of schematic diagrams of displaying a video preview according to Embodiment 1 of the present disclosure.

For example, as shown in FIG. 5a, when information of video 1 is located at the topmost end for more than 2 seconds, it is feasible to automatically play the video preview of video 1. The video preview in FIG. 3a is in a playing state (the figure only exemplarily indicate position and state information, and is not a real playing interface).

Figure 5B:
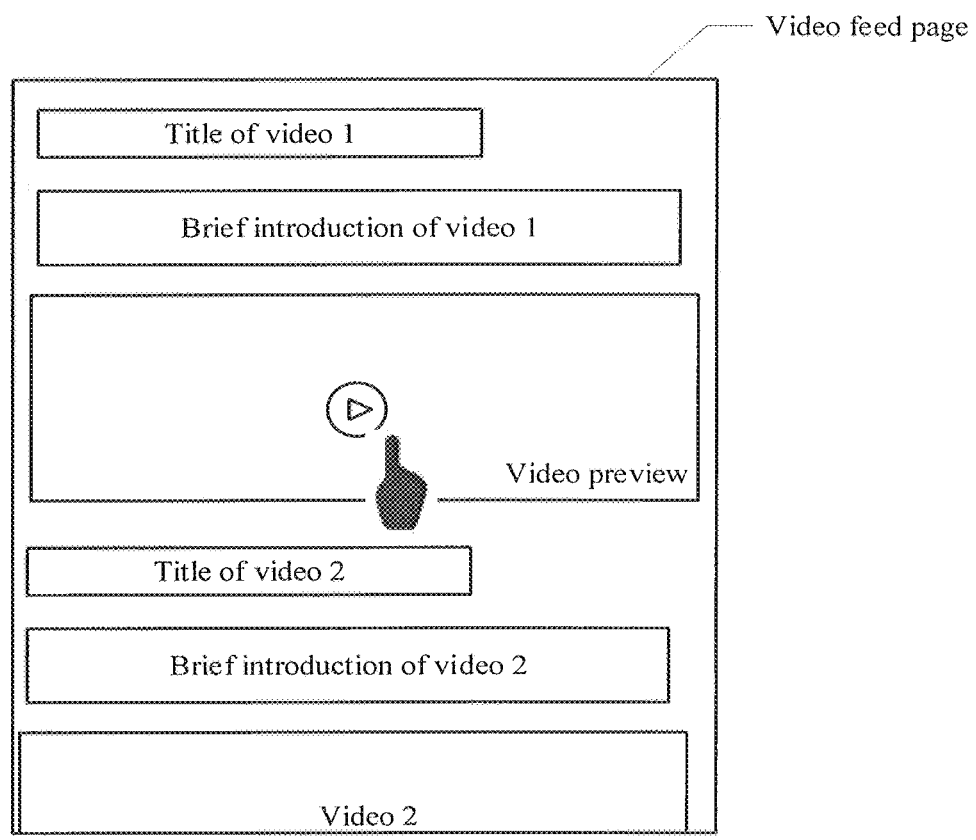

In addition to the manner of automatic play as stated in the step, it is also possible that the user's specific event triggers the play of the video preview. That is, it is possible to play the video preview of the target video after detecting an event the user triggers the play of the video preview of the target video. For example, as shown in FIG. 5b, after the target video is located, the interface may display indication information of video preview of the target video, and the user may know from the indication information that the video preview may be played. The indication information may be a specific symbol, or a specific graph, or specific words. As shown in FIG. 5b, words are used to indicate the video preview. The video preview may be played after the user clicks a component of the video preview (the component is directed to a playing link of the video preview).

In addition, during the playing of the video preview, it is possible to display prompt information that the video preview is being played. For example, as shown in FIG. 5a, it is possible to display the prompt information "in preview" at a lower right corner of a playing window of the video preview, so that the user can know what is being played is the video preview.

The video preview is the video segment extracted from the target video, and the user's purpose of performing video preview is to quickly acquire rough content or wonderful content of the target video. Therefore, it is possible to play the video preview in a fast playing manner. Certainly, it is also possible to play the video preview in a normal speed, or it is possible that the user operates to trigger fast playing of the preview, for example, click a fast playing component.

In addition, in some other cases, if the user does not concern the video preview that is being played, from the beginning or does not carefully concern the video preview that is being played, and he hopes to view the video preview from the beginning, it is possible to use a specific gesture to trigger playing the video preview from the beginning. For example, it is possible to click a specific reload component, or implement through a gesture such as leftward sliding.

At 303, play the target video after detecting an event that the user triggers the play of the target video.

If the user is determined to view the target video during the viewing of the video preview, or determined to view the target video after completion of the viewing of the video preview, he may trigger playing the target video. For example, it is possible to click a specific component on the page of playing the video preview to trigger playing the target video. After the specific component is triggered, it is possible to access a playing link of the target video to which the specific component is directed.

For example, after the video preview begins to be played, a link to which a window component of the video preview is directed is replaced with a playing link of the target video. After the user clicks the video preview that is being played (namely, a position of the window component), he triggers accessing the playing link of the target video to which the specific component is directed, thereby playing the target video.

It is possible to directly play the target video still on a current page, or play the target video after the page jumps to the playing page of the target video.

The method according to the present disclosure is described above in detail. An apparatus for executing the above method may be an application located at the native terminal, or may be a function unit such as a plug-in or a Software Development Kit (SDK) located in the application of the native terminal, or may be located at a server side. This is not specifically limited by the embodiments of the present disclosure. The apparatus according to the present disclosure is described in detail in conjunction with embodiments.

Figure 6:
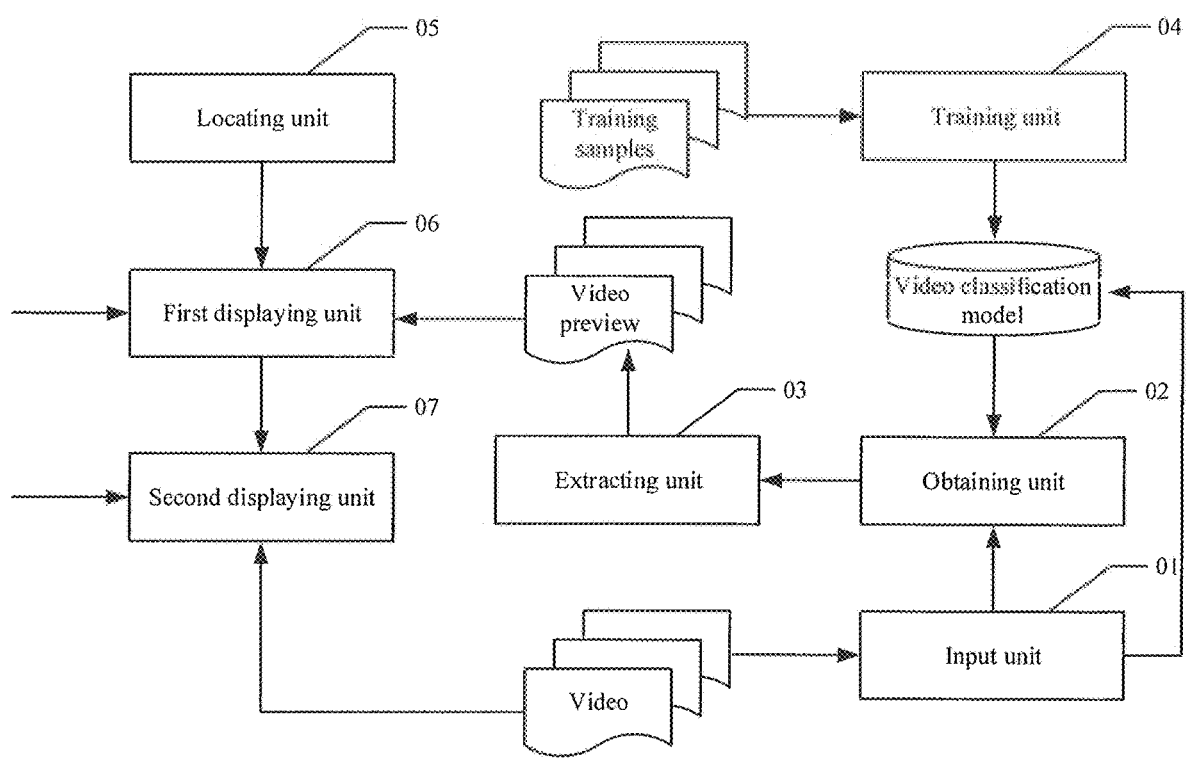
FIG. 6 is a structural diagram of an apparatus according to embodiments of the present disclosure.

FIG. 6 is a block diagram of an apparatus of displaying video according to an embodiment of the present disclosure. As shown in FIG. 6, the apparatus may comprise: an input unit 01, an obtaining unit 02 and an extracting unit 03, and may further comprise: a training unit 04, a locating unit 05, a first displaying unit 06 and a second displaying unit 07. Main functions of respective units are as follows:

The input unit 01 is configured to input a video into a video classification model obtained by pre-training.

The video classification model involved in the present disclosure may comprise the following portions: a Convolutional Neural Network (CNN), a time sequence neural network, an attention module and a fully-connected layer.

The training unit 04 is configured to train the video classification model, and specifically executes:

take a video whose video class is pre-annotated, as training data;

train the video classification model by taking the video of the training data as input of the video classification model and by taking the corresponding video class as output of the video classification model, to minimize a loss function of a classification result.

Specifically, the training unit 04 may specifically execute in the training process of the video classification model:

take the video in the training data as input of a convolutional neural network, and output convolutional features of respective frames in the video;

take the convolutional features of respective frames as input of a time sequence neural network, to output time sequence features of respective frames, the time sequence neural network being LSTM, RNN or GRU;

take time sequence features of respective frames as input of the attention module to output weights of respective frames;

map to a video type at the fully-connected layer according to weights of respective frames and output of the time sequence neural network.

Specifically, it is possible to use the weights of respective video frames output by the attention module to perform weighted processing for time sequence features of the respective video frames, and take an obtained vector as the input of the fully-connected layer.

It is feasible to use a mapping result to calculate a loss function, for example, use a gradient descent algorithm to calculate a cross entropy loss function of the classification result, then feed back the cross entropy loss function to adjust parameters in layers in the model, and continue to train with a purpose of minimizing the loss function.

The obtaining unit 02 is configured to obtain weights of respective video frames output by the attention module in the video classification model.

After the video whose video preview is to be extracted is input into the duly-trained video classification model, the video classification model begins to classify the video. That is, after extracting the convolutional features from respective frames of the video, the convolutional neural network outputs the convolutional features to the LSTM; after using the convolutional features of respective frames to extract time sequence features of respective frames, the LSTM outputs the time sequence features to the attention module; the attention module determines attention weights of respective frames according to time sequence features of respective frames; vectors of the video are obtained after performing weighting processing for time sequence features and the attention weights of respective frames; the fully-connected layer uses the vectors to perform mapping to obtain the class of the video.

However, the obtaining unit 02 obtains weights of respective video frames by only obtaining the output of the attention module in the video classification model.

The extracting unit 03 is configured to extract continuous N video frames whose total weight value satisfies a preset requirement, as the video preview of the video, N being a preset positive integer.

The extracting unit 03 may use a sliding window. During the sliding of the sliding window, a total weight of all frames in the window is calculated respectively, and the total weight may be a sum of weights of respective frames in the window. After completion of the sliding of the sliding window, it is possible to select video frames included by a sliding window position whose total weight satisfies a preset requirement, as the video preview. The preset requirement may be a maximum total weight value, or the total weight value exceeding a preset threshold.

The video previews of respective videos extracted in the above manner may be stored. The video previews, when displayed in the subsequent process, may be obtained from the stored video previews.

The locating unit 05 is configured to locate the target video on the page.

Specifically, the locating unit 05 may locate a video at a target position in a video feed page.

After the user enters the video feed page in a manner such as visiting a designated link or jumping after searching, if there only exists information of one video on the video feed page, the video is taken as the target video.

If there exist a plurality of videos on the video feed page, it is possible to take the video at the target position as the target video, for example, a video located at the topmost end or a video located at a designated area. It needs to be appreciated that as the user slides, different videos will be located at the target position in turn, and the video currently located at the target position is taken as the target video.

The locating unit 05 may also locate the video located at the target position in the video aggregation page. For example, the locating unit 05 takes the video located at the topmost end as the target video, or takes the video in a middle region as the target video.

The first displaying unit 06 is configured to display a video preview of the target video.

Wherein the first displaying unit 06 may, after the locating unit 05 locates the target video, automatically play the video preview of the target video; or play the video preview of the target video after detecting an event that the user triggers the play of the video preview.

The video preview may replace the position of the video cover in the prior art. The user may acquire rough content or wonderful sections of the target video through the video preview, thereby determining whether to view the target video.

As a preferred implementation mode, the first displaying unit 06, during the playing of the video preview, may display prompt information that the video preview is being played.

As a preferred implementation mode, the first displaying unit 06 may play the video preview in a fast playing manner.

In a preferred implementation mode, the first displaying unit 06 plays the video preview of the target video from beginning after detecting a gesture of triggering the play of the video preview from beginning, for example, a gesture of clicking a reloading component or leftward sliding.

The second displaying unit 07 is configured to play the target video after detecting an event that the user triggers the play of the target video. For example, it is possible to click a specific component on the page playing the video preview to trigger the play of the target video, and access a playing link of the target video to which the specific component is directed, after the specific component is triggered.

For example, after the video preview begins to be played, a link to which a window component of the video preview is directed is replaced with a playing link of the target video. After the user clicks the video preview that is being played (namely, a position of the window component), he triggers accessing the playing link of the target video to which the specific component is directed, thereby playing the target video.

It is possible to directly play the target video still on a current page, or play the target video after the page jumps to the playing page of the target video.

Figure 7:
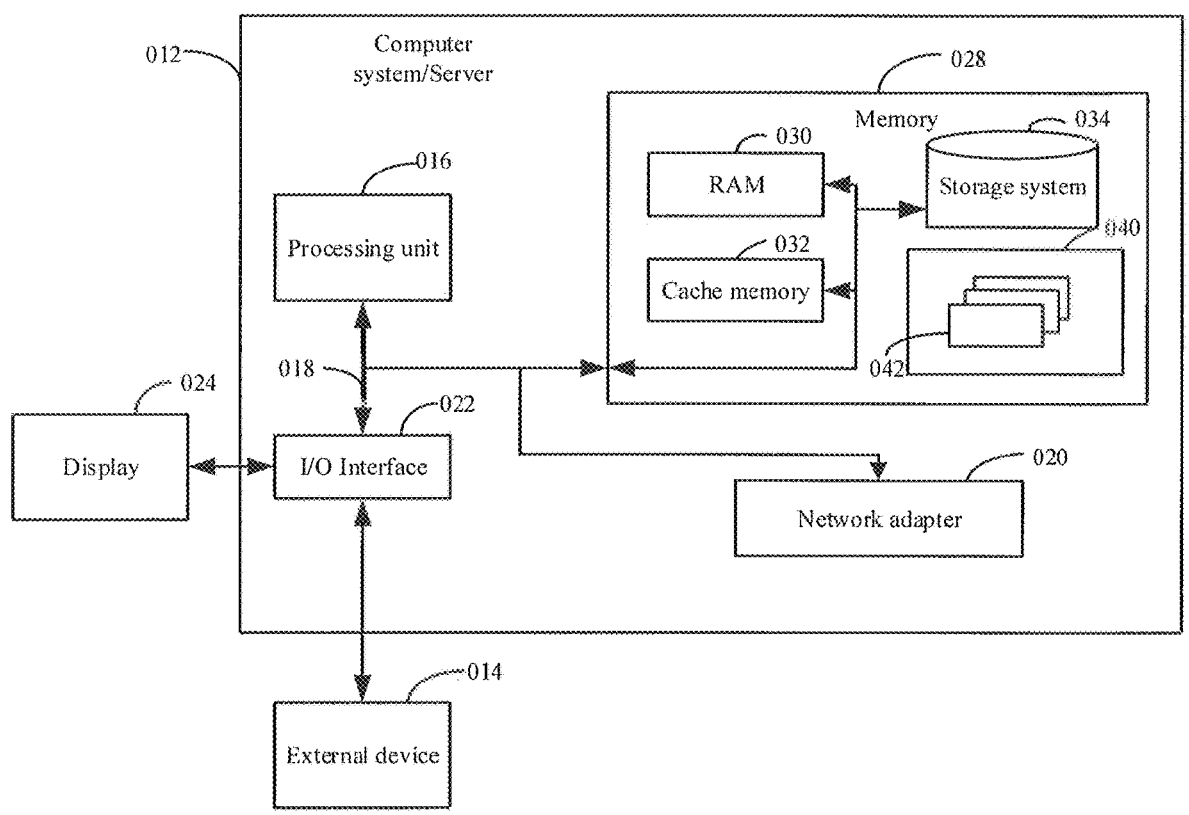
FIG. 7 is a block diagram of an example computer system/server adapted to achieve an implementation mode of the present disclosure.

FIG. 7 illustrates a block diagram of an example computer system/server 012 adapted to implement an implementation mode of the present disclosure. The computer system/server 012 shown in FIG. 7 is only an example and should not bring about any limitation to the function and scope of use of the embodiments of the present disclosure.

As shown in FIG. 7, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 7, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement steps of a method according to embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the flow of the method according to an embodiment of the present disclosure is performed by the one or more processors.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It can be seen from the above depictions that the method, apparatus, device and computer storage medium according to embodiments of the present disclosure may have the following advantages:

1) In the manner according to the present disclosure, it is possible to automatically extract continuous video frames from the video as the video preview, without requiring manual clipping, and with manpower costs being reduced.

2) According to the present disclosure, it is possible to, after locating the target video, display the video preview extracted from the target video. This displaying manner exhibits a stronger capability of expressing the video content, may reduce a probability of the user missing desired video resources, and may also attract the user's click, and improve a click-to-display ratio of the video.

3) The extracted video preview, as a dynamic cover, can reflect the video content very well, and reduce a probability that the user finds that the video content does not meet an expectation after he views the video content.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for extracting a video preview, wherein the method comprises:
   inputting a video into a video classification model obtained by pre-training, wherein the video classification model comprises a convolutional neural network, a time sequence neural network and an attention module;
   extracting convolutional features of respective frames of the video by the convolutional neural network;
   outputting time sequence features of the respective frames by the time sequence neural network according to the convolutional features of the respective frames;
   obtaining weights of the respective frames output by the attention module according to the time sequence features of the respective frames; and
   extracting continuous N frames of the video whose total weight value satisfies a preset requirement, as the video preview of the target video, N being a preset positive integer.

2. The method according to claim 1, wherein the video classification model further comprises a fully-connected layer.

3. The method according to claim 2, wherein the time sequence neural network comprises:
   a Short-Term Memory, a Recurrent Neural Network RNN or a Gated Recurrent Unit GRU.

4. The method according to claim 1, wherein the preset requirement comprises: a total weight value is the largest; or larger than or equal to a preset weight threshold.

5. The method according to claim 1, wherein the video classification model is trained by taking a training video whose video class is pre-annotated as input of the video classification model and by taking the corresponding video class as output of the video classification model, to minimize a loss function of a classification result.

6. The method according to claim 5, wherein during the training process of the video classification model, taking the training video as input of the convolutional neural network to output convolutional features of respective frames of the training video;
   taking the convolutional features of the respective frames of the training video as input of the time sequence neural network, to output time sequence features of the respective frames of the training video;
   taking the time sequence features of the respective frames of the training video as input of the attention module to output weights of the respective frames of the training video;
   mapping to a video class at a fully-connected layer according to weights of respective frames and output of the time sequence neural network;
   using a mapping result to calculate a loss function.

7. The method according to claim 1, wherein the method further comprises:
   if a target video is located on a page, displaying a video preview of the target video.

8. The method according to claim 7, wherein the locating the target video comprises:
   locating a video at a target position in a video feed page; or
   locating a video at a target position in a video aggregation page.

9. The method according to claim 7, wherein the displaying a video preview of the target video comprises:
   after locating the target video, automatically playing the video preview of the target video; or
   playing the video preview of the target video after detecting an event that that the user triggers the play of the video preview.

10. The method according to claim 9, wherein during displaying a video preview of the target video, displaying prompt information that the video preview is being played.

11. The method according to claim 7, wherein the method further comprises:
   playing the target video after detecting an event that the user triggers the play of the target video.

12. A device, wherein the device comprises:
   one or more processors,
   a storage for storing one or more programs,
   the one or more programs, when executed by said one or more processors, enable said one or more processors to implement a method for extracting a video preview, wherein the method comprises:

inputting a video into a video classification model obtained by pre-training, wherein the video classification model comprises a convolutional neural network, a time sequence neural network and an attention module;

extracting convolutional features of respective frames of the video by the convolutional neural network;

outputting time sequence features of the respective frames by the time sequence neural network according to the convolutional features of the respective frames;

obtaining weights of the respective frames output by the attention module according to the time sequence features of the respective frames; and extracting continuous N frames of the video whose total weight value satisfies a preset requirement, as the video preview of the target video, N being a preset positive integer.

13. The device according to claim 12, wherein the video classification model further comprises a fully-connected layer.

14. The device according to claim 13, wherein the time sequence neural network comprises:

a Short-Term Memory, a Recurrent Neural Network RNN or a Gated Recurrent Unit GRU.

15. The device according to claim 12, wherein the preset requirement comprises: a total weight value is the largest; or larger than or equal to a preset weight threshold.

16. The device according to claim 12, wherein the video classification model is trained by taking a training video whose video class is pre-annotated as input of the video classification model and by taking the corresponding video class as output of the video classification model, to minimize a loss function of a classification result.

17. The device according to claim 16, wherein during the training process of the video classification model, taking the training video as input of the convolutional neural network to output convolutional features of respective frames of the training video;

taking the convolutional features of the respective frames of the training video as input of the time sequence neural network, to output time sequence features of the respective frames of the training video;

taking the time sequence features of the respective frames of the training video as input of the attention module to output weights of the respective frames of the training video;

mapping to a video class at a fully-connected layer according to weights of respective frames and output of the time sequence neural network;

using a mapping result to calculate a loss function.

18. The device according to claim 12, wherein the method further comprises:

if a target video is located on a page, displaying a video preview of the target video.

19. The device according to claim 18, wherein the locating the target video comprises:

locating a video at a target position in a video feed page; or locating a video at a target position in a video aggregation page.

20. A non-transitory computer-readable storage medium including a computer-executable instruction which, when executed by a computer processor, executes a method for extracting a video preview, wherein the method comprises:

inputting a video into a video classification model obtained by pre-training, wherein the video classification model comprises a convolutional neural network, a time sequence neural network and an attention module;

extracting convolutional features of respective frames of the video by the convolutional neural network;

outputting time sequence features of the respective frames by the time sequence neural network according to the convolutional features of the respective frames;

obtaining weights of the respective frames output by the attention module according to the time sequence features of the respective frames; and extracting continuous N frames of the video whose total weight value satisfies a preset requirement, as the video preview of the target video, N being a preset positive integer.

* * * * *